(12) United States Patent
Shah et al.

(10) Patent No.: US 6,813,982 B1
(45) Date of Patent: Nov. 9, 2004

(54) POSITIONER AND CUTTING APPARATUS

(75) Inventors: Ashok Shah, Naperville, IL (US); Richard Frank Blum, Bolingbrook, IL (US)

(73) Assignee: Met-Coil Systems Corporation, Westfield, MA (US)

( * ) Notice: Subject to any disclaimer, the term of this patent is extended or adjusted under 35 U.S.C. 154(b) by 113 days.

(21) Appl. No.: 10/340,151

(22) Filed: Jan. 10, 2003

Related U.S. Application Data

(60) Provisional application No. 60/347,511, filed on Jan. 11, 2002.

(51) Int. Cl.[7] ................................................ B26D 5/26
(52) U.S. Cl. ............................. 83/42; 83/414; 83/417; 83/409.2; 83/444; 83/437.2
(58) Field of Search ........................... 83/36, 42, 412, 83/414, 417, 409.1, 409.2, 444, 437.4, 437.5, 931, 437.2

(56) References Cited

U.S. PATENT DOCUMENTS

| | | | | |
|---|---|---|---|---|
| 1,907,903 A | * | 5/1933 | Valiquette | 83/418 |
| 2,881,834 A | * | 4/1959 | Thumim | 83/437.4 |
| 2,882,970 A | * | 4/1959 | Schur | 493/47 |
| 3,641,858 A | | 2/1972 | Tuschy et al. | |
| 3,898,901 A | * | 8/1975 | Savage | 83/343 |
| 4,152,963 A | * | 5/1979 | Romanik et al. | 83/762 |
| 4,380,943 A | | 4/1983 | Evans | |
| 4,382,395 A | * | 5/1983 | Haar | 83/76.8 |
| 4,512,225 A | | 4/1985 | Green | |
| 4,907,337 A | * | 3/1990 | Krusi | 483/55 |
| 4,926,728 A | * | 5/1990 | Kawabata | 83/251 |
| 5,014,583 A | * | 5/1991 | Webb et al. | 83/76.9 |
| 5,878,641 A | * | 3/1999 | Tsune | 83/277 |

FOREIGN PATENT DOCUMENTS

GB         678028        8/1952

* cited by examiner

Primary Examiner—Charles Goodman
(74) Attorney, Agent, or Firm—McCormick, Paulding & Huber LLP

(57) ABSTRACT

A computerized positioning and cutting apparatus and method for automatically cutting structures to predetermined lengths with a minimum amount of scrap for a given project. The apparatus includes a frame and a positioning trough supported by the frame. A magazine is mounted to the frame, which is sized to receive uncut lengths of structure to be selectively fed to the positioning trough. A drive system is mounted to the frame and connected to a positioning system for positioning the uncut structures in the trough. A cutter is mounted on the frame to cut the structures as the positioning system feeds the structures through the trough. A controller having an associated computer system is in electrical communication with the drive system and the cutter. The computer system calculates the optimum number of cuts per a predetermined uncut length of structure to produce a minimum amount of waste structure for the project.

20 Claims, 8 Drawing Sheets

POSITIONER AND CUTTING APPARATUS

CROSS REFERENCE TO RELATED APPLICATIONS

This application claims the benefit of U.S. Provisional Application Ser. No. 60/347,511, filed on Jan. 11, 2002.

FIELD OF THE INVENTION

The present invention relates in general to a positioner and cutting apparatus. More specifically, the present invention relates to an automatic conduit cutting apparatus for the Heating, Ventilating and Air Conditioning (HVAC) industry, wherein a plurality of conduits are cut to optimum lengths to provide internal reinforcements of ducting.

BACKGROUND OF THE INVENTION

Ductwork is utilized to facilitate the heating, ventilation and cooling of various buildings, both residential and commercial. The ductwork typically comprises individual duct sections which are then coupled together to form a continuous, largely airtight duct for conveying a moving mass of air.

The duct sections are typically made from strong, yet relatively light, material such as sheet metal, or the like. It is an important design characteristic that the duct remain as lightweight as possible in order to minimize the size and weight of fasteners and other structural components required to support the ductwork, as well as maintaining materials and fabrication costs of the ductwork itself at reasonable costs.

Commonly utilized ductwork often have rectangular, circular or oval cross sections, and are frequently manufactured and supplied in pre-cut lengths or sections with transversely outwardly protruding interconnection flanges provided at opposite longitudinal ends of the section, to facilitate interconnecting duct sections at a job site, and thus form the finished air conveying ducts of desired lengths.

Whatever the size or shape of the ductwork, the relatively small thickness of the walls of the ductwork, as compared to its cross-sectional dimensions, results in the duct walls being rather flexible. Conventional ductwork may therefore experience large, possibly destructive and oftentimes loud structural deformations if static or dynamic air pressure differentials between the interior and the exterior of the ductwork exceeds a predetermined threshold value. For this reason, mechanical engineering standards (e.g., standards written by the Sheet Metal and Air Conditioning Contractor's National Association or SMACNA), as well as most building codes, require that certain ductwork be reinforced against expansion and/or collapse.

These reinforcements can be either internal or external. External reinforcements may be accomplished by using various structural shapes such as bars, angle iron or the like. Internal reinforcements generally include structures, such as conduit or threaded rods, that span the width or height of the ducting and are attached to the ducting side walls.

One known internal reinforcement mechanism for ductworks is shown in FIG. 1 and includes a threaded tie rod 2 oriented between opposite planar sides of a rectangular duct 4. Fixed, inner washers 6 are disposed adjacent the interior side of the opposing duct walls 4, while exterior washers 8 are disposed on the exterior of the duct walls 4 in matching relation to one another. As shown in FIG. 1, a threaded nut 10 is screwed down against each of the exterior washers 8 to secure the reinforcing tie rod in position.

There are several variations of the reinforcing mechanism shown in FIG. 1 and these variations may also include rubber O-rings or other elastic sealing devices disposed between the washers and the duct walls. Moreover, it is also known to replace the fixed, inner washers 6 with threaded nuts or lock nuts which may then be tightened in association with the tightening of the exterior threaded nuts 10 to provide the necessary rigidity to the reinforcing mechanism.

FIG. 2 illustrates a cross-sectional view of another known internal reinforcing mechanism which is comprised of a metallic tube 10 and an insert 12. After the insert 12 has been disposed within the tube 10, the tube 10 is crimped so as to deform in a radially inward direction. The crimped section of the tube 10 becomes locked within an annular groove 14 which has been inscribed about the periphery of the insert 12, thus locking the insert 12 within the tube 10. A threaded bolt 14 extends from the insert 12 and would extend beyond the exterior of a duct wall to be secured thereto via a threaded nut, or the like. The insert 10 may also include an inner cavity to accommodate an unillustrated biasing member, such as a spring, wherein the spring would outwardly bias the bolt 16 for greater flexibility. The insert 12 may be made from a metallic material or from a plastic or polymer material.

FIGS. 3 and 4 illustrate two embodiments of cross-sectional views of an internal reinforcing mechanisms as described in Patent Application No. 60/412,722, titled "Duct Reinforcement Rod", filed on Sep. 23, 2002 and incorporated herein in its entirety by reference. As depicted in FIG. 3, the reinforcing rod 20 includes a metal tubing or conduit 22 and a standard bolt or jam nut 24. As illustrated in FIG. 3, the conduit 22 and the bolt 24 are sized so that the head 26 of the bolt 24 enjoys a tight fitting relationship with the inner diameter of the tubing 22 when the conduit 22 is pressed over the head 26. It will be appreciated that the length of the threaded section of the bolt 24 extends beyond the conduit 22 and may be varied in accordance with the specific design characteristics of the ductwork and the relative length of the bolt 24 utilized. Additionally, both a first and a second crimp, 30 and 32 respectively, are disposed above and below the head 26 to ensure against longitudinal movement of the bolt 24 within the conduit 22.

FIG. 4 illustrates an internal reinforcing rod 40 utilizing a threaded nut 42 in place of the bolt 24 shown in FIG. 3. As depicted in FIG. 4, the conduit 22 is pressed over the nut 42 and the conduit 22. In similar fashion to FIG. 3, both a first and a second crimp, 30 and 32 respectively, are disposed above and below the nut 42 to ensure against longitudinal movement of the nut 42 within the conduit 22.

Prior art software is generally utilized to determine the ductwork requirements for an entire project or job, such as the ductwork required in the construction of a new building. Problematically however, internal reinforcement requirements, such as size, quantity and length of conduits or the like, are not included in prior art software packages.

Moreover the raw materials, such as the threaded rod or conduit used in the reinforcement mechanisms illustrated in FIGS. 1–4, are generally sold in lengths that far exceed the assembled lengths of the reinforcement mechanisms. For example, ½ inch or ¾ inch nominal diameter conduit is generally sold in 10 foot lengths. Accordingly, even after the internal reinforcement requirements are calculated, the net lengths of each reinforcement must be cut from the 10 foot lengths of raw conduit. This can not only be a very time consuming and expensive process, it can also generate a lot of wasted conduit if care is not taken to determine the optimum cut lengths per 10 foot length based on the particular reinforcement requirements of a job. This problem of generated waste can be especially problematic for larger jobs, such as the construction of a large building.

With the forgoing problems and concerns in mind, it is the general object of the present invention to provide a conduit cutting apparatus which overcomes the above-described drawbacks while maximizing effectiveness and flexibility, and minimizing waste in the assembling process.

SUMMARY OF THE INVENTION

The present invention offers advantages and alternatives over the prior art by providing a computerized positioning and cutting apparatus for automatically cutting structures to predetermined lengths with a minimum amount of scrap for a given project. The apparatus includes a frame. A positioning trough is supported by the frame. A magazine is mounted to the frame, which is sized to receive uncut lengths of structure to be selectively fed to the positioning trough. A drive system is mounted to the frame and operatively connected to a positioning system for selectively positioning the uncut structures in the trough. A cutter is mounted on the frame to cut the structures as the positioning system feeds the structures in discreet lengths through the trough. A controller having an associated computer system is in electrical communication with the drive system and the cutter. The associated computer system calculates the optimum number of cuts per a predetermined uncut length of structure to produce a minimum amount of waste structure for the project.

In an alternative embodiment of the invention the positioning and cutting apparatus is a conduit cutting apparatus, and the structure is conduit to be used for internal reinforcement of HVAC ducting.

Another embodiment of the invention is provided in a method of cutting conduit for internal reinforcement requirements of HVAC ducting with a minimum amount of scrap for a given project. The method includes inputting project specifications into a computerized system associated with a controller of a conduit cutting apparatus. Ductwork requirements are then calculated for the project from the specifications. Internal reinforcement requirements are also determined for the ductwork. Then the optimum number of cuts per each predetermined length of uncut conduit to minimize scrap for the project are calculated. The computer determined amount and size of uncut conduit is loaded into the conduit cutting apparatus. The conduit cutting apparatus is then operated though the controller to produce the internal reinforcement requirements with the least amount of scrap conduit for the project.

DETAILED DESCRIPTION OF THE PREFERRED EMBODIMENTS

Figure 5:
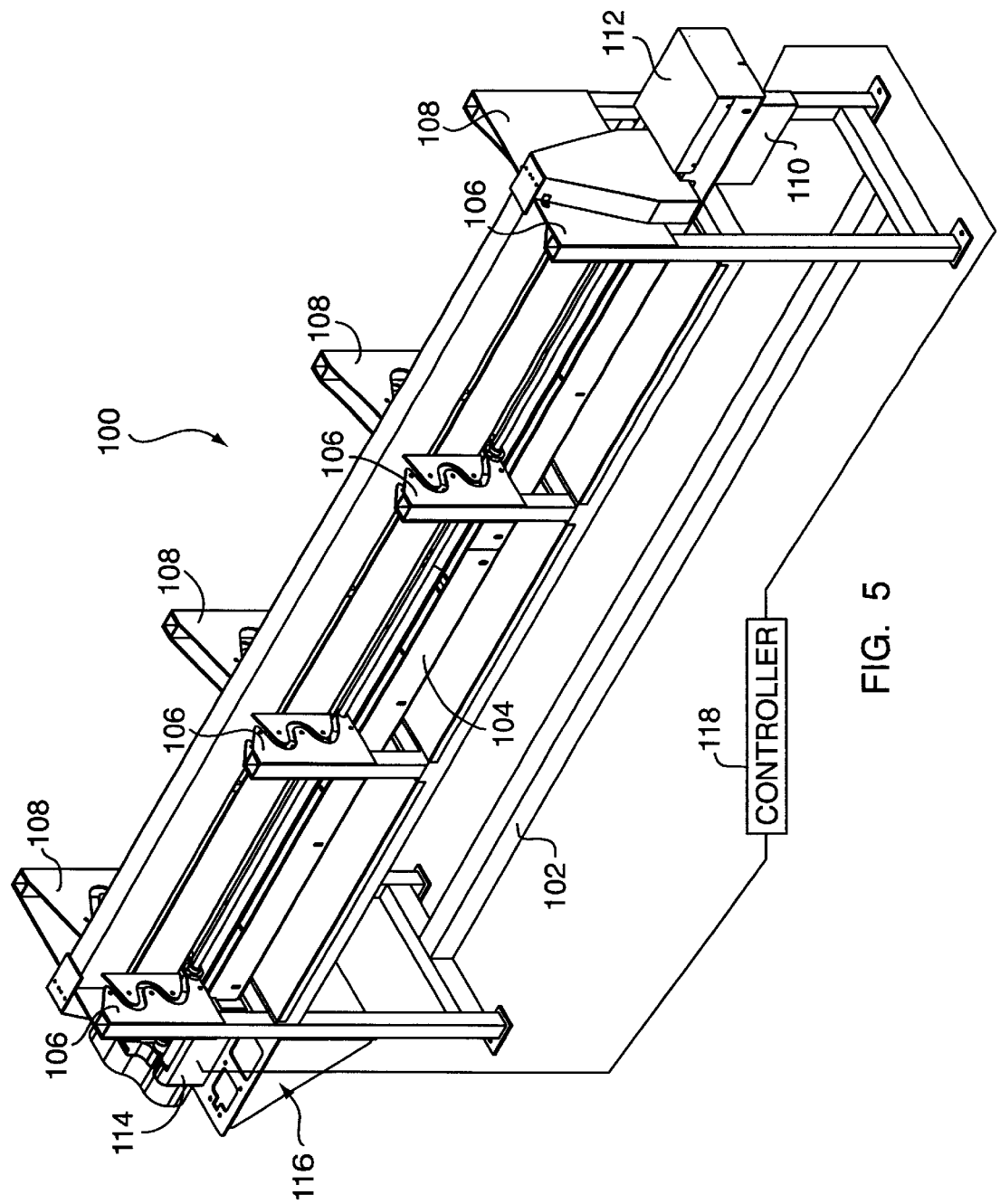
FIG. 5 is an isometric view of an exemplary embodiment of a conduit cutting apparatus in accordance with the present invention.
Figure 6:
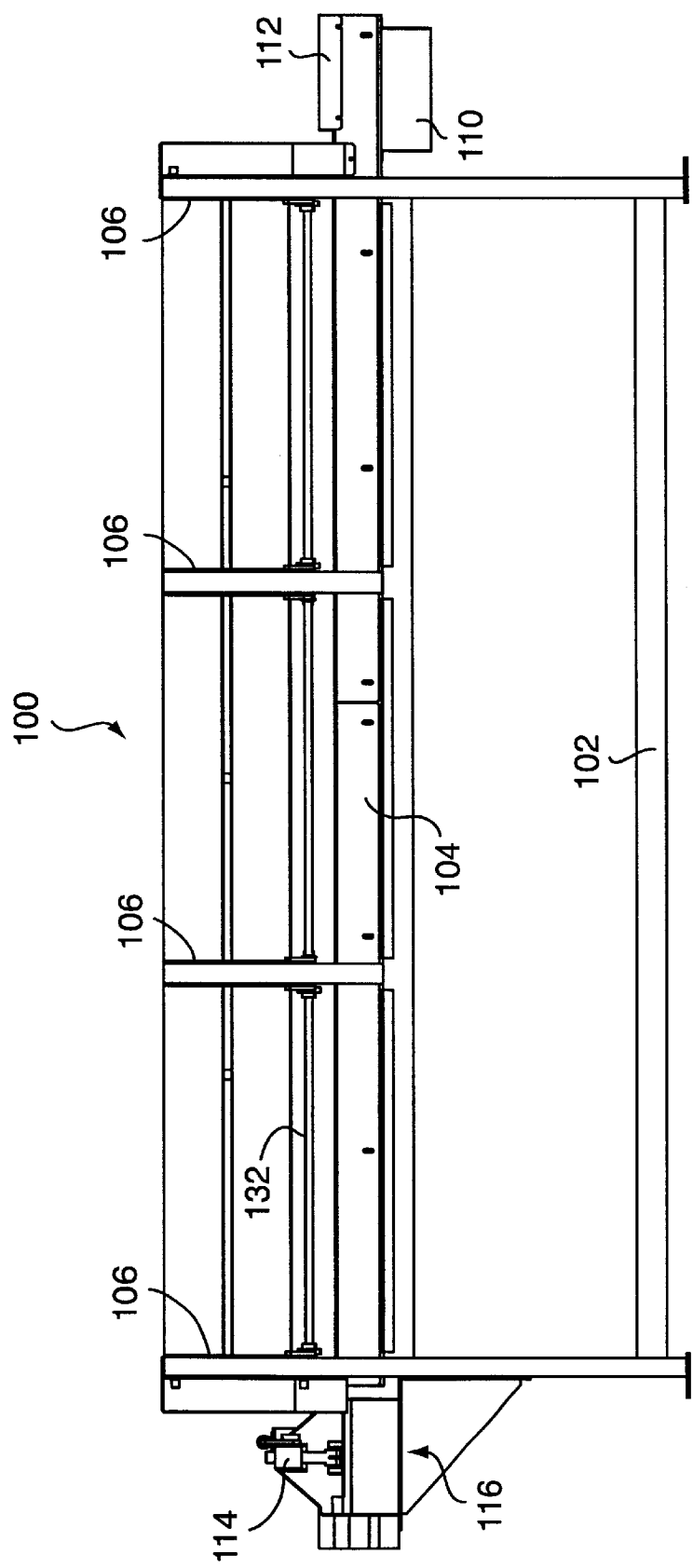
FIG. 6 is a side view of the conduit cutting apparatus of FIG. 5.
Figure 7:
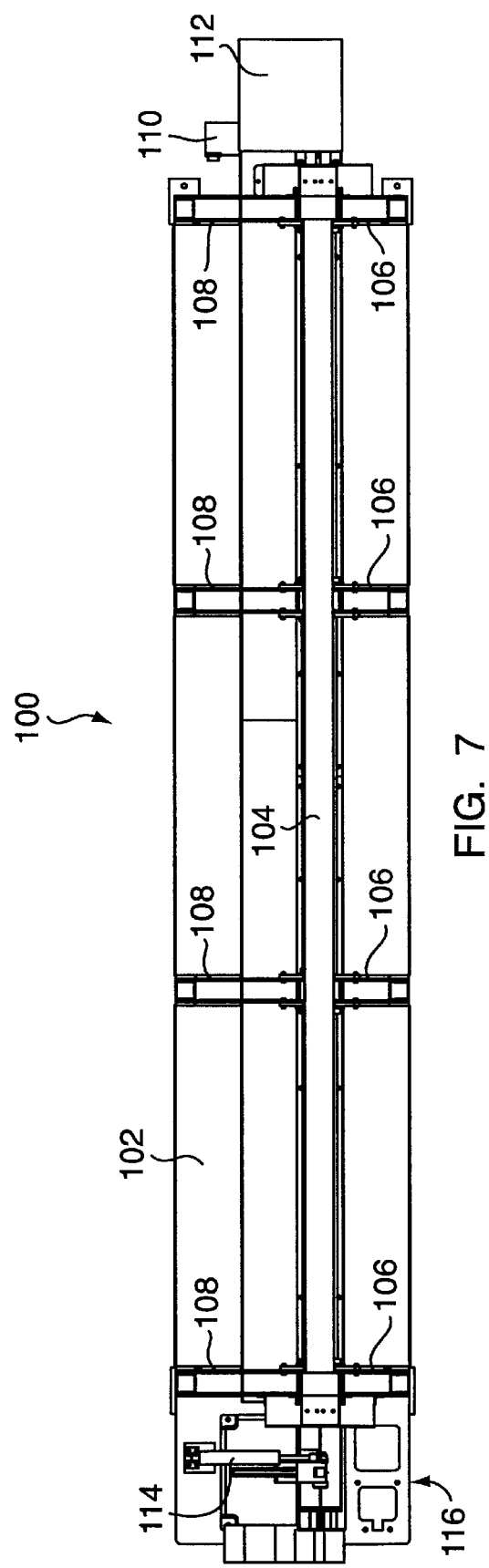
FIG. 7 is a top view of the conduit cutting apparatus of FIG. 5.

Referring to FIGS. 5, 6 and 7, an exemplary embodiment of a positioner and cutting apparatus, which is more particularly configured as a conduit (or pipe) cutting apparatus, in accordance with the present invention is shown generally at 100. As will be explained in greater detail herein, the conduit cutting apparatus 100 is configured and programmed to automatically cut predetermined lengths of uncut conduit, e.g., generally 10 feet in length, to meet the internal reinforcement requirements of HVAC ducting with a minimum of waste for any given job or project.

The conduit cutting apparatus 100 includes a generally rectangular metal frame 102 supporting a positioning trough 104 which runs along the length of the frame 102. The trough is sized to receive the full predetermined length of standard uncut conduit, e.g., generally 10 feet. Straddling the trough 104, and spaced generally equally from end to end along the length of the frame, are four pairs of magazines 106 and 108. A servo motor drive system 110 and a linear bearing positioning system 112 are mounted at one end of the frame 102 to drive and position the conduit after it has been fed through a selective one of the magazines 106, 108 and placed on the trough 104. A conduit cutter 114 is mounted at the opposing end of the frame 102 to cut the conduit as the positioning system 112 feeds the conduit in discreet lengths through the trough 104. Additionally, a crimping station 116 is provided along side the cutter 114 to facilitate any crimping operations that must be performed on the cut conduit as it emerges from the cutting operation.

The conduit cutting apparatus 100 also includes a computerized controller 118 (best seen in FIG. 5) which is in electrical communication with the cutter 114 and drive system 110. As will be described in more detail later, the controller 118 is programmed to cut the conduit to meet the requirements of a given job with a minimum of scrap.

Figure 8:
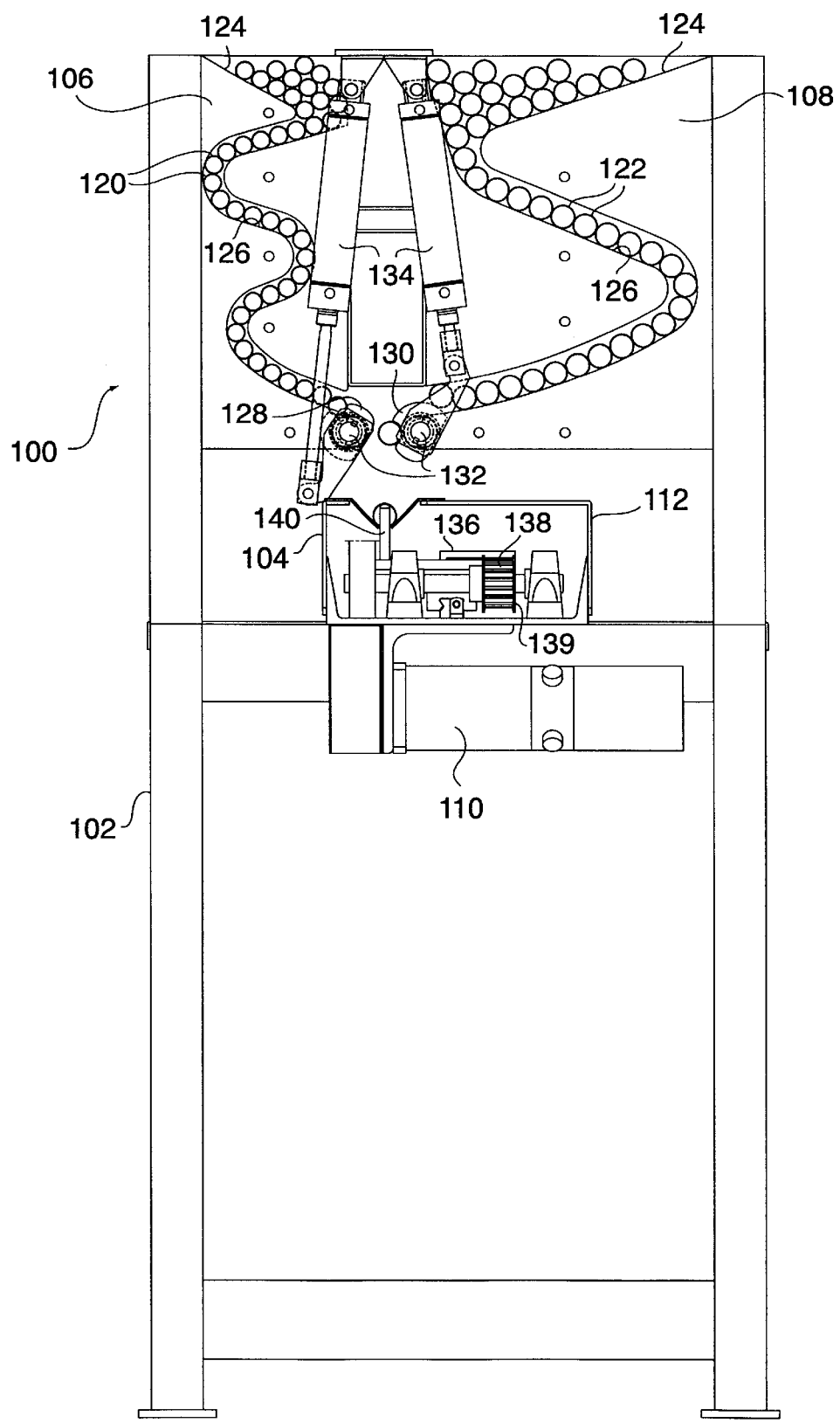
FIG. 8 is a rear view of the conduit cutting apparatus of FIG. 5.

Referring to FIG. 8, the magazines 106 and 108 are selectively sized to hold two sizes of conduit. That is magazines 106 are sized to hold a nominal ½ inch diameter conduit 120, and magazines 108 are sized to hold a nominal ¾ inch diameter conduit 122. The uncut conduits 120 and 122 are purchased in 10 foot nominal lengths. Accordingly, as can be seen from FIG. 5, there are four magazine pairs 106, 108 required to be spaced along the length of the support frame 102 in order to provide the proper control of the conduits as they descend toward the V shaped positioning trough 104.

The magazines 106, 108 include a hopper portion 124 which allows automatic self loading of the conduit to the point of however many pipes the hopper portions can hold. The hopper portion 124 empties into a sinuous tubing portion 126, sized to funnel the conduits down to a single file as they are gravity fed toward the trough 104.

At the bottom of the tubing portion 126 of the magazines 106, 108 the conduits 118, 120 engage with a pair of cams 128 and 130. As can be seen from FIGS. 5 and 6, the four pair of cams 128, 130 are each connected to a pair of rods 132, which straddle and extend the length of the trough 104. Each cam 128, 130 contains a notch sized to receive the appropriate conduit. That is cams 128 include a ½ inch notch to receive the ½ inch nominal conduits from magazine 106, and cams 103 include a ¾ inch notch to receive the ¾ inch nominal conduit from magazine 108. Air cylinders 134 are connected to rod 132 that has the cams 128, 130 mounted thereon. The cams 128, 130 each allow one of the conduits 120, 122 to drop into there respective notches. The controller 118 then selectively extends an air cylinder piston 134 to rotate a selective one of the rods 132 with its attached cams 128 or 130, and drop a selective one of the conduits 120, 122 onto the positioning trough 104 to be cut.

The positioning system 112 includes a linear bearing block 136 which is clamped to a timing belt 138 located on the side of the linear bearing block 136 farthest from the trough 104. The timing belt 138 is attached to pulleys 139 located at the opposing longitudinal ends of the frame 102 to form a continuous loop running parallel to the trough 104. The linear bearing 136 includes a pusher pin 140 located to an opposing side of the linear bearing 136 and directly in line with the apex of the V shaped trough 104.

Figure 9:
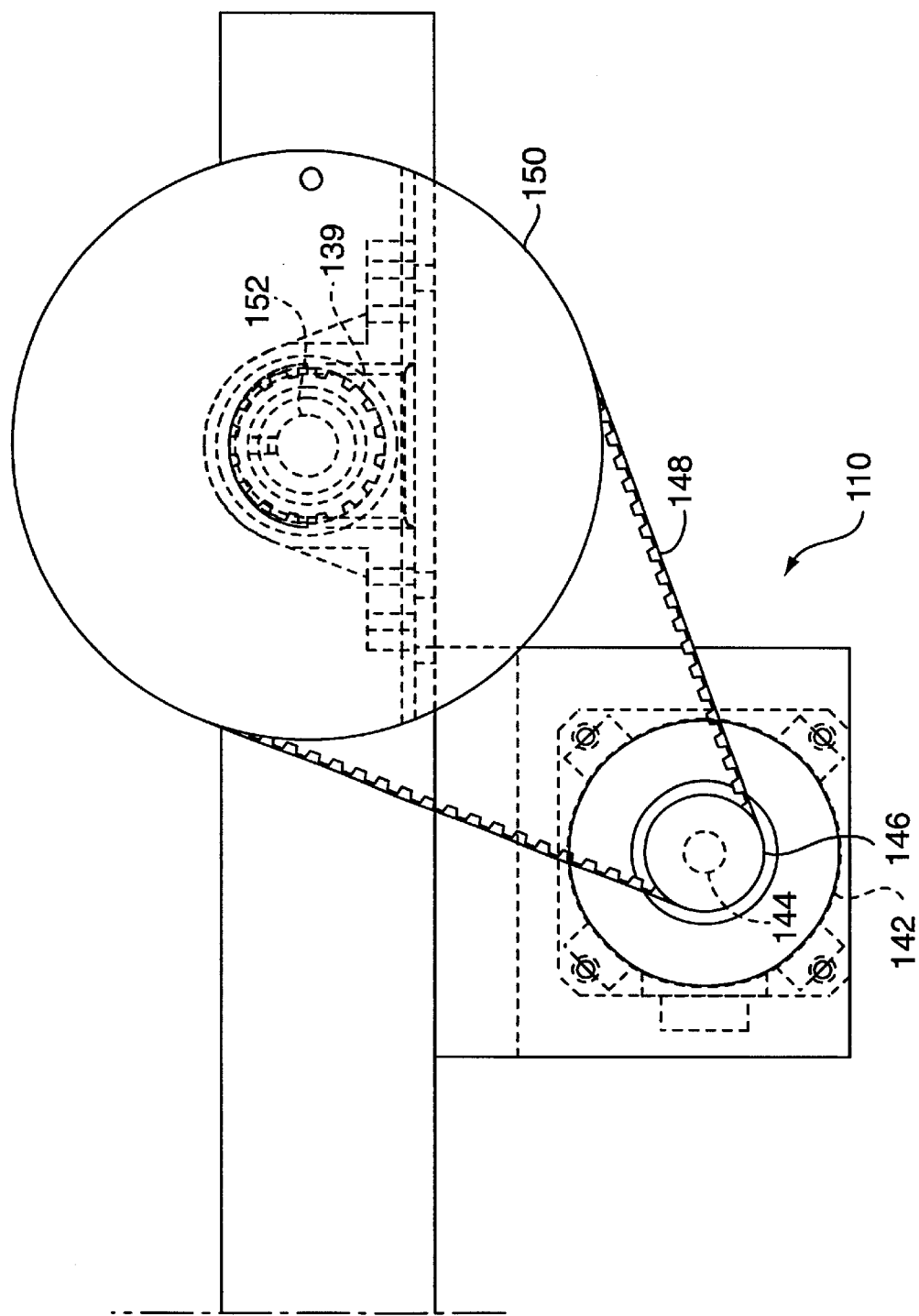
FIG. 9 is a cut away view of the motor control system of FIG. 8 taken along the lines 9—9.

Referring to FIG. 9, the servo motor drive system 110 is mounted underneath the linear bearing positioning system 112, and includes a servo motor having a drive shaft 144 with a small pulley 146 mounted concentrically thereon. The small pulley drives a timing belt 148 which in turn drives a larger pulley 150. The larger pulley 150 is mounted on a shaft 152 which extends through to the pulley 139 which the larger timing belt 138 of the positioning system 112 is mounted on.

As the motor 142 turns, it sends encoded signals to the controller 118 indicative of the pusher pin's 140 location relative to the trough 104. Simultaneously, the timing belts 138 and 148 pull the linear bearing block 136 and pusher pin 140 to the precise position associated with the encoded signals. Accordingly, the pusher pin feeds the computer determined length of conduit along the trough 104 and into the cutter 114, whereupon the controller 118 signals the cutter 114 to cut the conduit. The positioning system 112 and associated pusher pin 140 continue to position the next cut until the conduit is too short for use. The control then returns the pusher pin 140 to the home position for another conduit to be loaded. This operation continues until the requirements of the project are satisfied.

Figure 10:
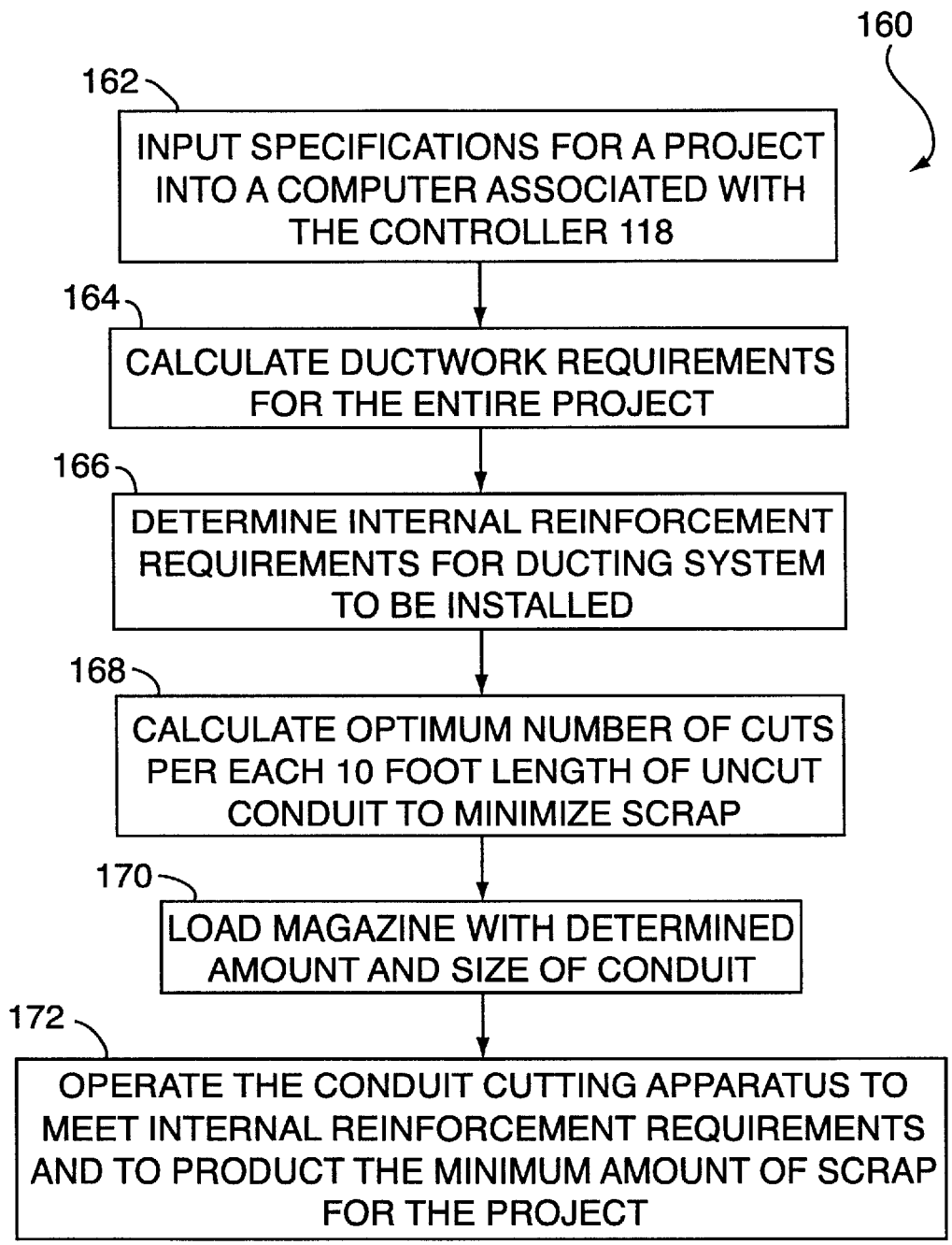
FIG. 10 is a flow chart illustrating an exemplary embodiment of a method of cutting conduit in accordance with the present invention.

Referring to FIG. 10, a flow chart illustrating the method of cutting the conduit in accordance with the present invention is shown generally at 160. Initially, as illustrated in block 162, specifications for a project are input into a computer system associated with the controller 118. As will be appreciated by one skilled in the art, the associated computer system may be integrally part of the controller 118 or remotely located. Stepping to block 164, the software of the computer system in turn calculates and creates the ductwork requirements for the entire project, e.g., construction of a new building or remodeling of an existing building.

Once the ductwork requirements are calculated, the software will, in block 166, further determine any of the internal reinforcement requirements for the ducting system to be installed. For example, size and lengths of the conduit to be used with each internal reinforcement to be used in the project, and whether the conduit will be crimped with a condu-plug, a standard bolt or a standard nut as illustrated in FIGS. 2, 3 and 4 respectively.

Advantageously as illustrated in block 168, the software will additionally calculate the optimum number of cuts per each predetermined, e.g., 10 foot, length of uncut conduit in order to minimize the amount of waste or scrap lengths of conduit for the project.

The required amount and size of conduit, as determined by the computerized controller 118, is then loaded into the magazines 106, 108 of the conduit cutting apparatus 100, as shown in block 170. The controller 118 then, in block 172, operates the conduit cutting apparatus 100 as described above until the optimum amount of cuts are made to meet internal reinforcement requirements and produce the least amount of scrap for the project.

Figure 1:
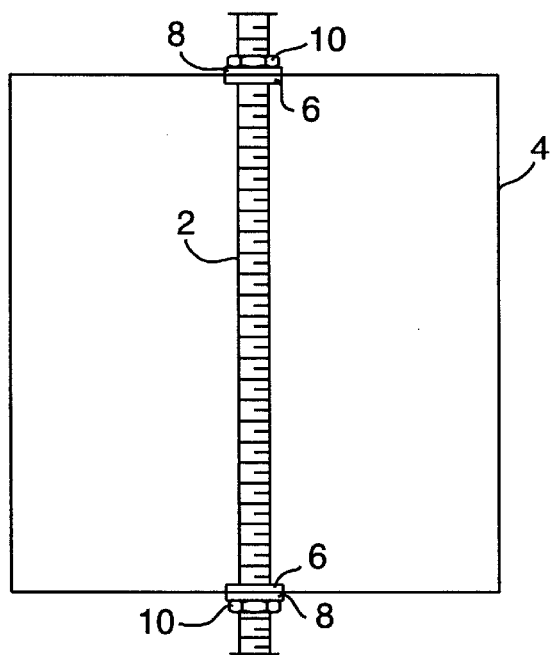
FIG. 1 illustrates a prior art internal reinforcement for HVAC duct utilizing a length of threaded rod attached to the duct walls with nuts.
Figure 2:
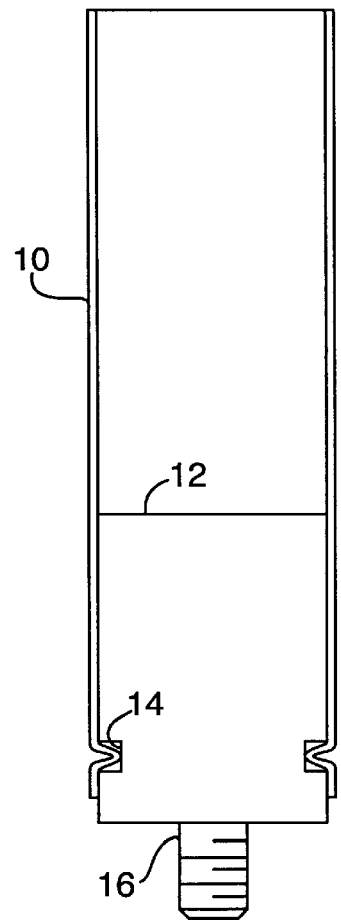
FIG. 2 illustrates a prior art internal reinforcement for HVAC ducting utilizing conduit attached to the duct walls with condu-plugs.
Figure 3:
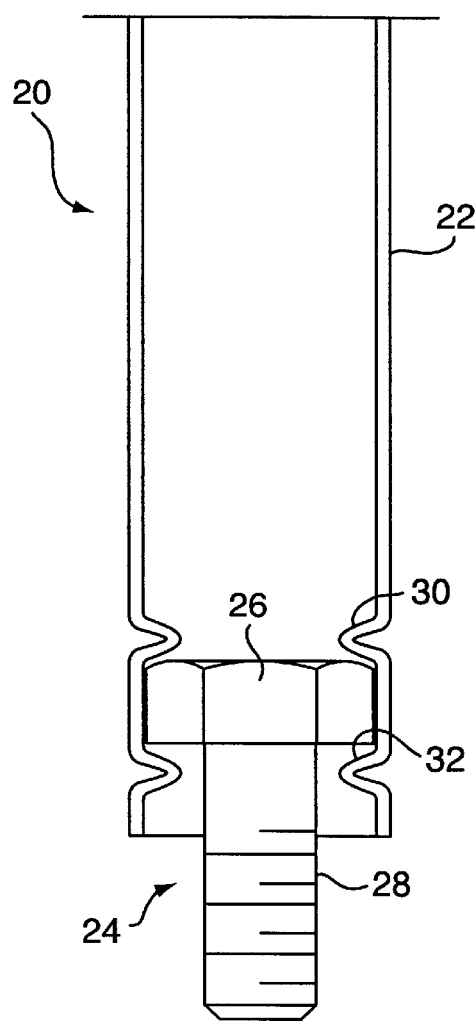
FIG. 3 illustrates an internal reinforcement for HVAC utilizing conduit attachable to the duct walls with crimped bolts.
Figure 4:
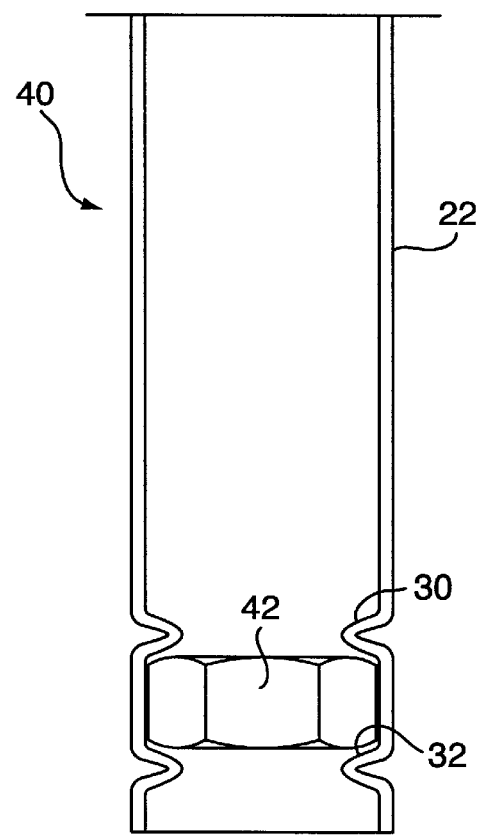
FIG. 4 illustrates an internal reinforcement for HVAC utilizing conduit attachable to the duct walls with crimped nuts.

While the above method and apparatus described a conduit cutting apparatus for cutting such conduits as illustrated in FIGS. 2, 3 and 4, it will be clear to one skilled in the art that other types of structures may also be cut by the same method and apparatus. For example, the threaded rod illustrated in FIG. 3 may also be cut and optimized in the same way.

Additionally, there are other applications which exist other than internal reinforcements of HVAC ducting. Indeed, any structure that can fit into the magazines and trough, or for which the magazines and trough can be modified to handle, may be cut in accordance with this invention. For example, screen frame profiles for doors and windows, i.e., the frames that hold the screens taut to give the screens their shape, may also be cut to length through the above described apparatus and method.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method of cutting conduit for internal reinforcement requirements of HVAC ducting with a minimum amount of scrap for a given HVAC project, the method comprising:

inputting project specifications into a computerized system associated with a controller of a conduit cutting apparatus;

calculating ductwork requirements for the project from the specifications;

determining internal reinforcement requirements for the ductwork;

calculating an optimum number of cuts per a predetermined quantity of the conduit at a predetermined length to produce a minimum amount of scrap conduit for the project;

loading the predetermined quantity of conduit into the conduit cutting apparatus; and operating the conduit cutting apparatus though the controller to meet the internal reinforcement requirements with the least amount of scrap conduit for the project.

2. The method of claim 1 comprising:

funneling the conduits in a single file toward a trough of the conduit cutting apparatus; and moving a pusher pin along the trough to selectively position the conduit in the trough to be cut.

3. The method of claim 2 comprising:

driving the pusher pin with a drive motor which sends encoded signals to a controller indicative of position of the conduit relative to the trough.

4. A computerized positioning and cutting apparatus for automatically cutting structural parts to discrete lengths with a minimum amount of scrap for a given project, the apparatus comprising:

a frame;

a positioning trough supported by the frame;

a magazine mounted to the frame sized to receive predetermined lengths of the structural parts to be selectively fed to the positioning trough;

a drive system mounted to the frame and operatively connected to a positioning system for selectively positioning the structural parts in the trough to be cut;

a cutter mounted on the frame to cut the structural parts as the positioning system feeds the structural parts in selective discrete lengths through the trough; and a controller having an associated computer system in electrical communication with the drive system and the cutter;

wherein the associated computer system calculates the optimum number of cuts per a predetermined quantity of the structural parts to produce a minimum amount of scrap structural parts for the project.

5. The positioning and cutting apparatus of claim 4 wherein the cutting apparatus is a conduit cutting apparatus and the structural parts are conduit to be used for internal reinforcement of HVAC ducting.

6. The positioning and cutting apparatus of claim 4 wherein the positioning system comprises a pusher pin movable along the length of the trough to selectively position the structural parts in the trough to be cut.

7. The positioning and cutting apparatus of claim 6 wherein the positioning system comprises:

a linear bearing block clamped to the pusher pin; and a timing belt operatively connected to the linear bearing block and the drive system.

8. The positioning and cutting apparatus of claim 4 wherein the drive system comprises a servo motor mounted to the frame, wherein the motor sends encoded signals to the controller indicative of position of the structural parts relative to the trough.

9. The positioning and cutting apparatus of claim 8 wherein the drive system comprises a timing belt operatively connected between the motor and the positioning system.

10. The positioning and cutting apparatus of claim 4 comprising:

a plurality of magazines sized to receive a predetermined plurality of sizes of structural parts.

11. The positioning and cutting apparatus of claim 4 wherein the magazine comprises:

a hopper portion for loading the structural parts; and a tubing portion sized to funnel the structural parts down to a single file as they are gravity fed toward the trough.

12. The positioning and cutting apparatus of claim 11 comprising:

a cam attached to end of the tubing portion of the magazine, the cam having a notch sized to receive the structural parts as they are fed down to; and a cylinder operatively connected to the cam and responsive to signals from the controller;

wherein, when the controller signals the cylinder, the cylinder extends and rotates the cam to drop a selective one of the conduits onto the trough to be cut.

13. A computerized positioning and cutting apparatus for automatically cutting conduit to discrete lengths with a minimum amount of scrap to meet internal reinforcement requirement of HVAC ducting for a given HVAC project, the cutting apparatus comprising:

a frame;

a positioning trough supported by the frame;

a plurality of magazines mounted to the frame along the length of the trough sized to receive predetermined lengths of the conduit to be selectively fed to the positioning trough;

a drive system mounted to the frame and operatively connected to a positioning system for selectively positioning the conduit in the trough to be cut;

a cutter mounted on the frame to cut the conduit as the positioning system feeds the conduit in selective discrete lengths through the trough; and a controller having an associated computer system in electrical communication with the drive system and the cutter;

wherein the associated computer system calculates the optimum number of cuts per a predetermined quantity of the conduit to produce a minimum amount of scrap conduit for the project.

14. The positioning and cutting apparatus of claim 13 wherein the positioning system comprises a pusher pin movable along the length of the trough to selectively position the conduit in the trough to be cut.

15. The positioning and cutting apparatus of claim 14 wherein the positioning system comprises:

a linear bearing block clamped to the pusher pin; and a timing belt operatively connected to the linear bearing block and the drive system.

16. The positioning and cutting apparatus of claim 13 wherein the drive system comprises a servo motor mounted to the frame, wherein the motor sends encoded signals to the controller indicative of position of the conduit relative to the trough.

17. The positioning and cutting apparatus of claim 16 wherein the drive system comprises a timing belt operatively connected between the motor and the positioning system.

18. The positioning and cutting apparatus of claim 13 comprising:

a plurality of magazines sized to receive a predetermined plurality of diameters of conduit.

19. The positioning and cutting apparatus of claim 13 wherein the magazine comprises:

a hopper portion for loading the structural parts; and a tubing portion sized to funnel the conduit down to a single file as they are gravity fed toward the trough.

20. The positioning and cutting apparatus of claim 19 comprising:

a cam attached to end of the tubing portion of the magazine, the cam having a notch sized to receive the conduits as they are fed down to; and a cylinder operatively connected to the cam and responsive to signals from the controller;

wherein, when the controller signals the cylinder, the cylinder extends and rotates the cam to drop a selective one of the conduits onto the trough to be cut.

* * * * *